(12) United States Patent
Zhao et al.

(10) Patent No.: US 12,504,536 B2
(45) Date of Patent: Dec. 23, 2025

(54) TERMINAL

(71) Applicant: VIVO MOBILE COMMUNICATION CO., LTD., Guangdong (CN)

(72) Inventors: Hengwei Zhao, Guangdong (CN); Xuejun Xiao, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 1101 days.

(21) Appl. No.: 17/505,490

(22) Filed: Oct. 19, 2021

(65) Prior Publication Data

US 2022/0035033 A1 Feb. 3, 2022

Related U.S. Application Data

(63) Continuation of application No. PCT/CN2020/085653, filed on Apr. 20, 2020.

(30) Foreign Application Priority Data

Apr. 24, 2019 (CN) .......................... 201910335071.X

(51) Int. Cl.
*G01S 17/08* (2006.01)
*G01S 7/481* (2006.01)

(52) U.S. Cl.
CPC .............. *G01S 17/08* (2013.01); *G01S 7/481* (2013.01); *G01S 7/4813* (2013.01)

(58) Field of Classification Search
CPC ................................ G01S 17/08; G01S 7/4813
See application file for complete search history.

(56) References Cited

U.S. PATENT DOCUMENTS 8,969,842 B2* 3/2015 Minamikawa ........ H01L 25/167
250/221
2007/0228263 A1 10/2007 Shen et al.
(Continued)

FOREIGN PATENT DOCUMENTS

CN 101904178 A 12/2010
CN 103727965 A 4/2014
(Continued)

OTHER PUBLICATIONS

International Search Report of International Application No. PCT/CN2020/085653 mailed on Jul. 21, 2020.
(Continued)

*Primary Examiner* — Thomas A Hollweg
*Assistant Examiner* — Kirsten D. Endresen
(74) *Attorney, Agent, or Firm* — IP & T GROUP LLP

(57) ABSTRACT

A terminal includes: a glass cover plate, an infrared sensor including a transmitter and a receiver, and a first light guide structure and/or a second light guide structure. The first light guide structure is fixed between the transmitter and the glass cover plate, and the second light guide structure is fixed between the receiver and the glass cover plate. The first light guide structure extends obliquely from a light emitting surface of the transmitter toward the glass cover plate, and an oblique direction is away from an orthographic projection of the receiver on the glass cover plate. The second light guide structure extends obliquely from a light emitting surface of the receiver toward the glass cover plate, and an oblique direction is away from an orthographic projection of the transmitter on the glass cover plate.

19 Claims, 2 Drawing Sheets

(56) References Cited

U.S. PATENT DOCUMENTS

| | | | |
|---|---|---|---|
| 2011/0248152 A1 | 10/2011 | Svajda et al. | |
| 2013/0341650 A1 | 12/2013 | Peng | |
| 2014/0191253 A1* | 7/2014 | Haslbeck | H01L 25/167 |
| | | | 438/26 |

FOREIGN PATENT DOCUMENTS

| | | | |
|---|---|---|---|
| CN | 105527627 A | 4/2016 | |
| CN | 106353767 A | 1/2017 | |
| CN | 206332707 U | 7/2017 | |
| CN | 107064906 A | 8/2017 | |
| CN | 206490700 U | 9/2017 | |
| CN | 107835272 A | 3/2018 | |
| CN | 108493185 A | 9/2018 | |
| CN | 108616616 A | 10/2018 | |
| CN | 108828612 A | 11/2018 | |
| CN | 108898951 A | 11/2018 | |
| CN | 108989494 A | 12/2018 | |
| CN | 109218472 A | 1/2019 | |
| CN | 109655840 A | 4/2019 | |
| CN | 208721790 U | 4/2019 | |
| CN | 110333515 A | 10/2019 | |
| DE | 202013100781 U1 | 5/2013 | |
| EP | 2565603 A2 | 3/2013 | |
| EP | 3373039 A1 | 9/2018 | |
| JP | 2019-510988 A | 4/2019 | |
| WO | 2019/066527 A2 | 4/2019 | |

OTHER PUBLICATIONS

Written Opinion of The International Searching Authority of International Application No. PCT/CN2020/085653 mailed on Jul. 21, 2020.
The First Office Action of Priority Application No. CN 201910335071.X mailed on Nov. 30, 2020.
The Second Office Action of Priority Application No. CN 201910335071.X mailed on May 7, 2021.
The Third Office Action of Priority Application No. CN 201910335071.X mailed on Jul. 29, 2021.
Extended European Search Report for application 20795909.9 issued by the European Patent Office on May 3, 2022.

* cited by examiner

TERMINAL

CROSS-REFERENCE TO RELATED APPLICATIONS

This application is a Bypass Continuation Application of PCT/CN2020/085653 filed on Apr. 20, 2020, which claims priority to Chinese Patent Application No. 201910335071.X filed on Apr. 24, 2019, which are incorporated herein by reference in their entirety.

TECHNICAL FIELD

The present disclosure relates to the field of electronic technologies, and in particular, to a terminal.

BACKGROUND

Most terminals use infrared sensors to implement proximity detection. The infrared sensor includes two parts: an emission part and a receiving part. Energy of reflected infrared light is different when distances of measured objects are different, so that distance detection can be implemented. Limited by space and costs, the emission part and the receiving part of the infrared sensor are encapsulated in one component. The infrared sensor is placed on a PCB. An infrared ray penetrates a hidden hole on a glass cover plate, and is reflected by a shielded object to a receiver of the infrared sensor. When there is no shielding above the terminal, some infrared light is reflected by a surface of the glass cover plate to the receiver, and an infrared value is obtained, which is referred to as an infrared "background noise" of a whole system.

Specifically, limited by design reliability and a length of an electronic component, a transmitter and a receiver in the infrared sensor cannot be too far from each other. In addition, an upper surface of the infrared sensor needs to be kept at a distance from a lower surface of the glass cover plate based on stacking of the whole system. However, in this case, there is a large overlapping area (for example, an overlapping area 101 shown in FIG. 1) between an emission window and a receive window of the infrared sensor at a cover plate position, and consequently a large amount of light is directly reflected by the cover plate. Therefore, in an infrared sensor solution in the related art, a problem of large infrared background noise may exist. Consequently, a dynamic range (dynamic range=total range−background noise) that can be used to detect a distance is relatively small.

SUMMARY

Embodiments of the present disclosure provide a terminal, including:
 a glass cover plate;
 an infrared sensor, where the infrared sensor includes a transmitter and a receiver; and
 a first light guide structure and/or a second light guide structure, where the first light guide structure is fixed between the transmitter and the glass cover plate, and the second light guide structure is fixed between the receiver and the glass cover plate;
 the first light guide structure obliquely extends from a light emitting surface of the transmitter toward the glass cover plate, and an oblique direction is away from an orthographic projection of the receiver on the glass cover plate; and
 the second light guide structure obliquely extends from a light emitting surface of the receiver toward the glass cover plate, and an oblique direction is away from an orthographic projection of the transmitter on the glass cover plate.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "and/or" in this specification describes only an association relationship for describing associated objects and represents that three relationships may exist. For example, A and/or B may represent the following three cases: only A exists, both A and B exist, and only B exists.

Figure 1:
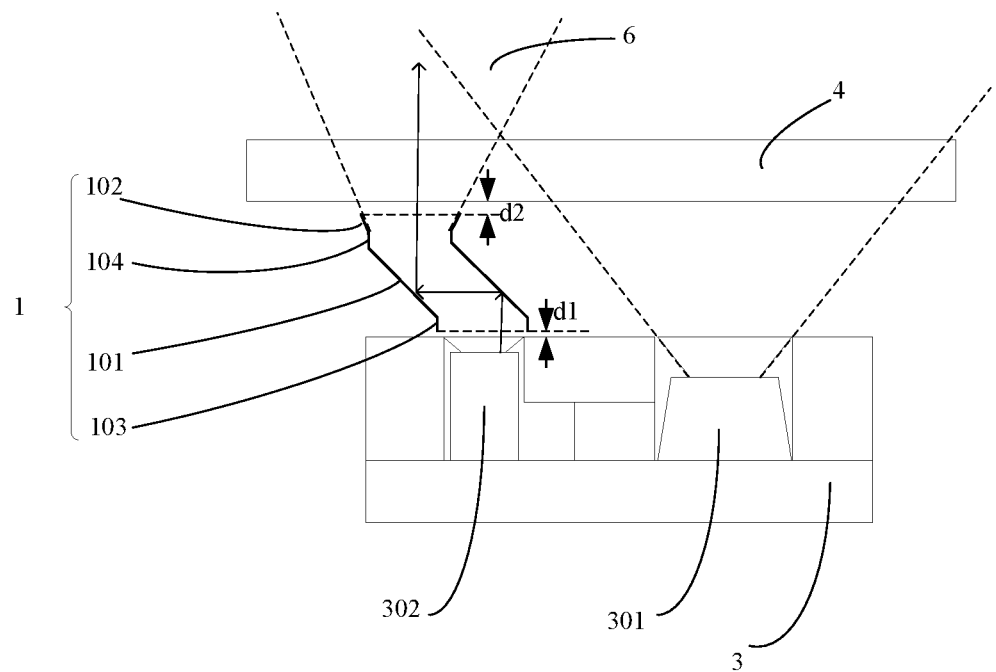
FIG. 1 is a schematic structural diagram 1 of a terminal according to an embodiment of the present disclosure.
Figure 2:
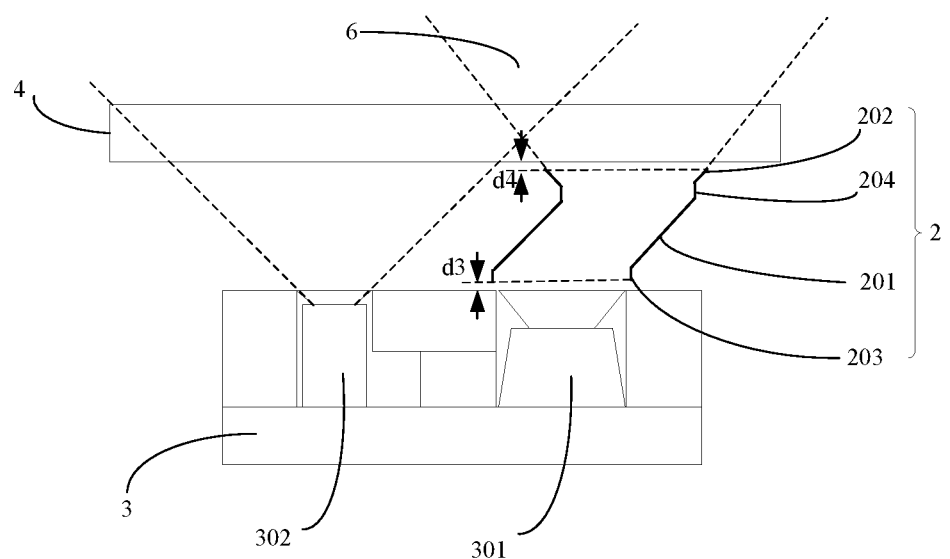
FIG. 2 is a schematic structural diagram 2 of a terminal according to an embodiment of the present disclosure.
Figure 3:
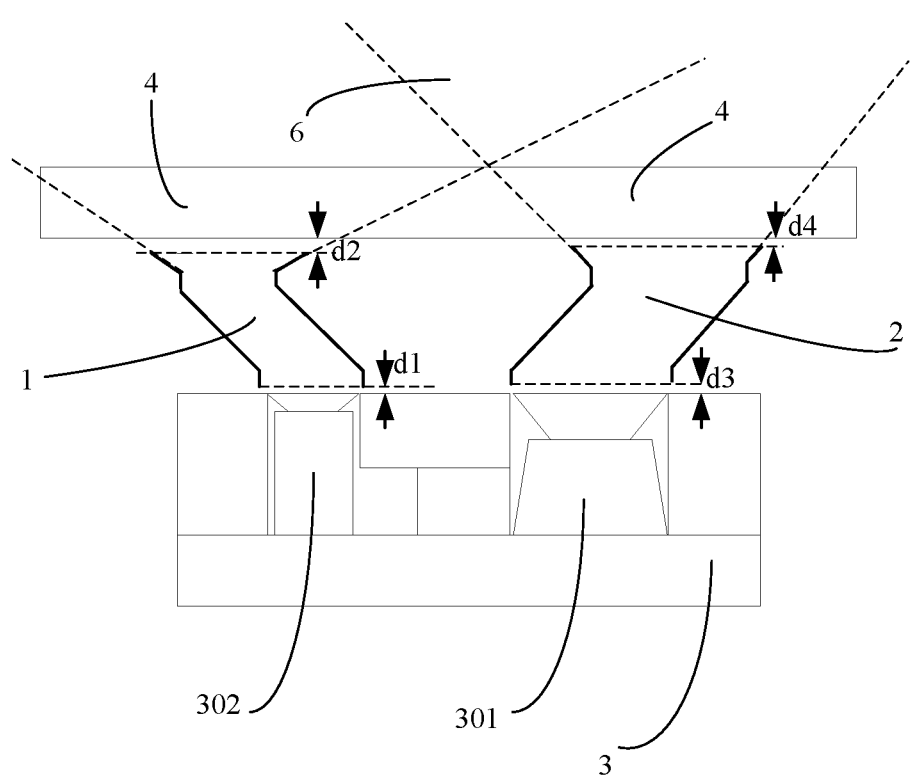
FIG. 3 is a schematic structural diagram 3 of a terminal according to an embodiment of the present disclosure.

An embodiment of the present disclosure provides a terminal. As shown in FIG. 1 to FIG. 3, the terminal includes:
 a glass cover plate 4;
 an infrared sensor 3, where the infrared sensor 3 includes a transmitter 302 and a receiver 301; and
 a first light guide structure 1 and/or a second light guide structure 2, where the first light guide structure 1 is fixed between the transmitter 302 and the glass cover plate 4, and the second light guide structure 2 is fixed between the receiver 301 and the glass cover plate 4;
 the first light guide structure 1 obliquely extends from a light emitting surface of the transmitter 302 toward the glass cover plate 4, and an oblique direction is away from an orthographic projection of the receiver 301 on the glass cover plate 4; and
 the second light guide structure 2 obliquely extends from a light emitting surface of the receiver 301 toward the glass cover plate 4, and an oblique direction is away from an orthographic projection of the transmitter 302 on the glass cover plate 4.

It can be learned that in this embodiment of the present disclosure, a light guide structure is added between the transmitter of the infrared sensor and the glass cover plate and/or between the receiver of the infrared sensor and the glass cover plate, so that an actual emission window and/or a receive window extend toward a remote end of each other. In this way, an amount of light emitted from the transmitter of the infrared sensor is reflected by a surface of the glass cover plate facing the infrared sensor to enter the receiver is reduced, thereby reducing background noise of the infrared sensor.

Optionally, a nearest distance between the infrared sensor 3 and a target overlapping area 6 is greater than a distance between a first surface of the glass cover plate 4 and the infrared sensor 3, and the first surface is a surface of the glass cover plate 4 facing the infrared sensor 3; and the target overlapping area 6 is an overlapping area of an opening angle of the first light guide structure 1 facing the glass cover plate 4 and a receiving angle of the receiver 301, or an overlapping area of an opening angle of the second light guide structure 2 facing the glass cover plate 4 and an emission angle of the transmitter 302, or an overlapping area of the opening angle of the first light guide structure 1 facing the glass cover plate 4 and the opening angle of the second light guide structure 2 facing the glass cover plate 4.

For example, as shown in FIG. 1, when the first light guide structure 1 is added between the transmitter 302 of the infrared sensor 3 and the glass cover plate 4, a light guide action of the first light guide structure 1 is used, so that an actual emission window of the infrared sensor 3 extends in a direction away from a receive window. In this way, an overlapping area of the actual emission window and the receive window is located above a surface of the glass cover plate 4 facing the infrared sensor 3, that is, light emitted by the transmitter 302 of the infrared sensor 3 is not reflected by the surface of the glass cover plate 4 facing the infrared sensor 3 to enter the receiver 301, thereby reducing background noise of the infrared sensor 3. In addition, an emission field of view (FOV) may be increased by increasing an angle of a light emitting opening at an upper end of the first light guide structure 1.

As shown in FIG. 2, when the second light guide structure 2 is added between the receiver 301 of the infrared sensor 3 and the glass cover plate 4, a light guide action of the second light guide structure 2 is used, so that an actual receive window of the infrared sensor 3 extends in a direction away from an emission window. In this way, an overlapping area of the actual receive window and the emission window is located above a surface of the glass cover plate 4 facing the infrared sensor 3, that is, light emitted by the transmitter 302 of the infrared sensor 3 is not reflected by the surface of the glass cover plate 4 facing the infrared sensor 3 to enter the receiver 301, thereby reducing background noise of the infrared sensor 3. In addition, a receiving FOV may be increased by adjusting an angle of an opening of the second light guide structure 2 facing the glass cover plate 4.

As shown in FIG. 3, when the first light guide structure 1 is added between the transmitter 302 of the infrared sensor 3 and the glass cover plate 4, and the second light guide structure 2 is added between the receiver 301 of the infrared sensor 3 and the glass cover plate 4, light guide actions of the first light guide structure 1 and the second light guide structure 2 are used, so that an actual emission window and a receive window extend toward a remote end of each other. In this way, an overlapping area of the actual emission window and the receive window is located above a surface of the glass cover plate 4 facing the infrared sensor 3, that is, light emitted from the transmitter 302 of the infrared sensor 3 is not reflected by the surface of the glass cover plate 4 facing the infrared sensor 3 to enter the receiver 301, thereby reducing background noise of the infrared sensor 3.

Optionally, the first light guide structure 1 and/or the second light guide structure 2 may further be used, so that a nearest distance between the infrared sensor 3 and a target overlapping area 6 is greater than a distance between a second surface of the glass cover plate 4 and the infrared sensor 3, and the second surface is a surface that is of the glass cover plate 4 and that is away from the infrared sensor 3. That is, the first light guide structure 1 and/or the second light guide structure 2 may further be used, so that an actual emission window and/or a receive window extend toward a remote end of each other. In this way, an overlapping area of the actual emission window and the receive window is located above the second surface of the glass cover plate 4. In this way, light emitted from the transmitter 302 of the infrared sensor 3 is not reflected by the second surface of the glass cover plate 4 to enter the receiver 301, thereby preventing oil pollution on the second surface from affecting infrared detection.

Optionally, as shown in FIG. 1 and FIG. 3, the first light guide structure 1 includes a first light guide tube 101 and a second light guide tube 102. A first end of the first light guide tube 101 faces the transmitter 302, a second end of the first light guide tube 101 is communicated with and fixedly connected to a first end of the second light guide tube 102, and a second end of the second light guide tube 102 faces the glass cover plate 4. An inner wall of the first light guide tube 101 is coated with a specular reflection material, an inner wall of the second light guide tube 102 is coated with a light absorbing material, and an included angle between an axis of the first light guide tube 101 and a facing direction of the transmitter 302 is greater than 0° and less than 90°.

Both the first light guide tube 101 and the second light guide tube 102 are made of an opaque material. In addition, the first light guide tube 101 and the second light guide tube 102 may be hollow, or may be filled with a transparent light guide material.

Optionally, as shown in FIG. 1 and FIG. 3, a difference between an angle 45° and the included angle between the axis of the first light guide tube 101 and the facing direction of the transmitter 302 is within a preset range. That is, an opening plane of the first end of the second light guide tube 102 and the first light guide tube 101 are at an angle of 45°, so that light emitted from the transmitter 302 may be reflected through a sidewall of the first light guide tube 101 and then emitted vertically.

Optionally, as shown in FIG. 1 and FIG. 3, the second light guide tube 102 is horn-shaped, and a horn opening faces the glass cover plate 4. The second light guide tube 102 is horn-shaped and is configured to constrain an emission angle of an infrared ray that passes through the first light guide structure 1, and an opening angle thereof may be adjusted based on a requirement on the emission angle in actual application.

Optionally, as shown in FIG. 1 and FIG. 3, the first light guide structure 1 further includes a first transition light guide tube 103, a first end of the first transition light guide tube 103 faces the transmitter 302, a second end of the first transition light guide tube 103 is communicated with and fixedly connected to the first end of the first light guide tube 101, an inner wall of the first transition light guide tube 103 is coated with a specular reflection material, and an axis of the first transition light guide tube 103 is parallel to the facing direction of the transmitter 302.

Optionally, as shown in FIG. 1 and FIG. 3, the first light guide structure 1 further includes a second transition light guide tube 104, a first end of the second transition light guide tube 104 is communicated with and fixedly connected to the second end of the first light guide tube 101, a second end of the second transition light guide tube 104 is communicated with and fixedly connected to the first end of the second light guide tube 102, an inner wall of the second transition light guide tube 104 is coated with a specular reflection material, and an axis of the second transition light guide tube 104 is parallel to the facing direction of the transmitter 302.

The first transition light guide tube 103 and the second transition light guide tube 104 are configured to adjust an overall length of the first light guide structure 1, to be applicable to different distances between the glass cover plate 4 and the infrared sensor 3, thereby extending an application range of the first light guide structure 1.

Optionally, as shown in FIG. 2 and FIG. 3, the second light guide structure 2 includes a third light guide tube 201 and a fourth light guide tube 202. A first end of the third light guide tube 201 faces the receiver 301, a second end of the third light guide tube 201 is communicated with and fixedly connected to a first end of the fourth light guide tube 202, and a second end of the fourth light guide tube 202 faces the glass cover plate 4. An inner wall of the third light guide tube 201 is coated with a specular reflection material, an inner wall of the fourth light guide tube 202 is coated with a reflection material, and an included angle between an axis of the third light guide tube 201 and a facing direction of the receiver 301 is greater than 0° and less than 90°.

Both the third light guide tube 201 and the fourth light guide tube 202 are made of an opaque material. In addition, the third light guide tube 201 and the fourth light guide tube 202 may be hollow, or may be filled with a transparent light guide material.

Optionally, as shown in FIG. 2 and FIG. 3, a difference between an angle 45° and the included angle between the axis of the third light guide tube 201 and the facing direction of the receiver 301 is within a preset range. That is, an opening plane of the first end of the fourth light guide tube 202 and the third light guide tube 201 are at an angle of 45°, so that external light may be reflected through a sidewall of the third light guide tube 201 and then vertically enter the receiver 301.

Optionally, as shown in FIG. 2 and FIG. 3, the fourth light guide tube 202 is horn-shaped, and a horn opening faces the glass cover plate 4. The fourth light guide tube 202 is horn-shaped and is configured to constrain a receiving angle of an infrared ray that passes through the second light guide structure 2, and an opening angle thereof may be adjusted based on a requirement on the receiving angle in actual application.

Optionally, the reflection material coated on the inner wall of the fourth light guide tube 202 is a specular reflection material, so that light in more directions can enter the receiver 301, and coverage of received light is increased.

Optionally, as shown in FIG. 2 and FIG. 3, the second light guide structure 2 further includes a third transition light guide tube 203, a first end of the third transition light guide tube 203 faces the receiver 301, a second end of the third transition light guide tube 203 is communicated with and fixedly connected to the first end of the third light guide tube 201, an inner wall of the third transition light guide tube 203 is coated with a specular reflection material, and an axis of the third transition light guide tube 203 is parallel to the facing direction of the receiver 301.

Optionally, as shown in FIG. 2 and FIG. 3, the second light guide structure 2 further includes a fourth transition light guide tube 204, a first end of the fourth transition light guide tube 204 is communicated with and fixedly connected to the second end of the third light guide tube 201, a second end of the fourth transition light guide tube 204 is communicated with and fixedly connected to the first end of the fourth light guide tube 202, an inner wall of the fourth transition light guide tube 204 is coated with a specular reflection material, and an axis of the fourth transition light guide tube 204 is parallel to the facing direction of the receiver 301.

The third transition light guide tube 203 and the fourth transition light guide tube 204 are configured to adjust an overall length of the second light guide structure 2, to be applicable to different distances between the glass cover plate 4 and the infrared sensor 3, thereby extending an application range of the second light guide structure 2.

Optionally, the terminal further includes a support structure, where the support structure is located between the glass cover plate 4 and the infrared sensor 3, and the first light guide structure 1 and/or the second light guide structure 2 are/is fixed on the support structure. The first light guide structure 1 and/or the second light guide structure 2 are fixed on the support structure, to prevent movement of the first light guide structure 1 and/or the second light guide structure 2 from affecting a light guide action.

Optionally, the first light guide structure 1 is spaced from the transmitter 302 by a first preset distance d1, and the first light guide structure 1 is spaced from the glass cover plate 4 by a second preset distance d2. That is, an assembly distance is reserved between the first light guide structure 1, and the transmitter 302 and the glass cover plate 4, to prevent damage to the first light guide structure 1 in an assembly process.

Optionally, the second light guide structure 2 is spaced from the receiver 301 by a third preset distance d3, and the second light guide structure 2 is spaced from the glass cover plate 4 by a fourth preset distance d4. That is, an assembly distance is reserved between the second light guide structure 2, and the transmitter 302 and the glass cover plate 4, to prevent damage to the second light guide structure 2 in an assembly process.

In addition, when there is an assemble error between a light pore of the transmitter 302 of the infrared sensor 3 and the transmitter 302 on the glass cover plate 4, the first light guide structure 1 may be used for correction. Likewise, when there is an assemble error between a light pore of the receiver 301 of the infrared sensor 3 and the receiver 301 on the glass cover plate 4, the second light guide structure 2 may be used for correction.

In addition, for the second light guide structure 2 mentioned above, an orthographic end of a light receiver that is used to detect light intensity may be further mounted. In this case, an FOV may be increased by increasing an angle of a light emitting opening at an upper end of the second light guide structure 2, so that a light-sensitive detection direction is greater.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:
1. A terminal, comprising:
a glass cover plate;
an infrared sensor, wherein the infrared sensor comprises a transmitter and a receiver; and
a first light guide structure, wherein the first light guide structure is fixed between the transmitter and the glass cover plate, and
the first light guide structure obliquely extends from a light emitting surface of the transmitter toward the glass cover plate, and an oblique direction is away from an orthographic projection of the receiver on the glass cover plate;
wherein the first light guide structure comprises a first light guide tube and a second light guide tube, a first end of the first light guide tube faces the transmitter, a second end of the first light guide tube is communicated with and fixedly connected to a first end of the second light guide tube, and a second end of the second light guide tube faces the glass cover plate; and an inner wall of the first light guide tube is coated with a specular reflection material, an inner wall of the second light guide tube is coated with a light absorbing material, and an included angle between an axis of the first light guide tube and a facing direction of the transmitter is greater than 0° and less than 90°;

an actual emission window of the infrared sensor is close to the glass cover plate, and the actual emission window is away from a receive window of the infrared sensor in a direction towards the glass cover plate.

2. The terminal according to claim 1, wherein a nearest distance between the infrared sensor and a target overlapping area is greater than a distance between a first surface of the glass cover plate and the infrared sensor, and the first surface is a surface of the glass cover plate facing the infrared sensor; and the target overlapping area is an overlapping area of an opening angle of the first light guide structure facing the glass cover plate and a receiving angle of the receiver.

3. The terminal according to claim 1, wherein the first light guide structure further comprises a first transition light guide tube, a first end of the first transition light guide tube faces the transmitter, a second end of the first transition light guide tube is communicated with and fixedly connected to the first end of the first light guide tube, an inner wall of the first transition light guide tube is coated with a specular reflection material, and an axis of the first transition light guide tube is parallel to the facing direction of the transmitter.

4. The terminal according to claim 1, wherein the first light guide structure further comprises a second transition light guide tube, a first end of the second transition light guide tube is communicated with and fixedly connected to the second end of the first light guide tube, a second end of the second transition light guide tube is communicated with and fixedly connected to the first end of the second light guide tube, an inner wall of the second transition light guide tube is coated with a specular reflection material, and an axis of the second transition light guide tube is parallel to the facing direction of the transmitter.

5. The terminal according to claim 1, wherein a difference between an angle 45° and the included angle between the axis of the first light guide tube and the facing direction of the transmitter is within a preset range;

or, the second light guide tube is horn-shaped, and a horn opening faces the glass cover plate.

6. The terminal according to claim 1, further comprising a support structure, wherein the support structure is located between the glass cover plate and the infrared sensor, and the first light guide structure is fixed on the support structure.

7. The terminal according to claim 1, wherein the first light guide structure is spaced from the transmitter by a first preset distance, and the first light guide structure is spaced from the glass cover plate by a second preset distance.

8. A terminal, comprising:
a glass cover plate;
an infrared sensor, wherein the infrared sensor comprises a transmitter and a receiver; and
a second light guide structure, wherein the second light guide structure is fixed between the receiver and the glass cover plate; and the second light guide structure obliquely extends from a light receiving surface of the receiver toward the glass cover plate, and an oblique direction is away from an orthographic projection of the transmitter on the glass cover plate;

wherein the second light guide structure comprises a third light guide tube and a fourth light guide tube, a first end of the third light guide tube faces the receiver, a second end of the third light guide tube is communicated with and fixedly connected to a first end of the fourth light guide tube, and a second end of the fourth light guide tube faces the glass cover plate; and an inner wall of the third light guide tube is coated with a specular reflection material, an inner wall of the fourth light guide tube is coated with a reflection material, and an included angle between an axis of the third light guide tube and a facing direction of the receiver is greater than 0° and less than 90°;

an actual receive window of the infrared sensor is close to the glass cover plate, and the actual receive window is away from an emission window of the infrared sensor in a direction towards the glass cover plate.

9. The terminal according to claim 8, wherein a nearest distance between the infrared sensor and a target overlapping area is greater than a distance between a first surface of the glass cover plate and the infrared sensor, and the first surface is a surface of the glass cover plate facing the infrared sensor; and the target overlapping area is an overlapping area of an opening angle of the second light guide structure facing the glass cover plate and an emission angle of the transmitter.

10. The terminal according to claim 8, wherein the second light guide structure further comprises a third transition light guide tube, a first end of the third transition light guide tube faces the receiver, a second end of the third transition light guide tube is communicated with and fixedly connected to the first end of the third light guide tube, an inner wall of the third transition light guide tube is coated with a specular reflection material, and an axis of the third transition light guide tube is parallel to the facing direction of the receiver.

11. The terminal according to claim 8, wherein the second light guide structure further comprises a fourth transition light guide tube, a first end of the fourth transition light guide tube is communicated with and fixedly connected to the second end of the third light guide tube, a second end of the fourth transition light guide tube is communicated with and fixedly connected to the first end of the fourth light guide tube, an inner wall of the fourth transition light guide tube is coated with a specular reflection material, and an axis of the fourth transition light guide tube is parallel to the facing direction of the receiver.

12. The terminal according to claim 8, wherein a difference between an angle 45° and the included angle between the axis of the third light guide tube and the facing direction of the receiver is within a preset range;

or, the fourth light guide tube is horn-shaped, and a horn opening faces the glass cover plate;

or, the reflection material coated on the inner wall of the fourth light guide tube is a specular reflection material.

13. The terminal according to claim 8, further comprising a support structure, wherein the support structure is located between the glass cover plate and the infrared sensor, and the second light guide structure is fixed on the support structure.

14. The terminal according to claim 8, wherein the second light guide structure is spaced from the receiver by a third preset distance, and the second light guide structure is spaced from the glass cover plate by a fourth preset distance.

15. A terminal, comprising:
a glass cover plate;
an infrared sensor, wherein the infrared sensor comprises a transmitter and a receiver; and
a first light guide structure and a second light guide structure, wherein the first light guide structure is fixed between the transmitter and the glass cover plate, and the second light guide structure is fixed between the receiver and the glass cover plate;
the first light guide structure obliquely extends from a light emitting surface of the transmitter toward the glass cover plate, and an oblique direction is away from an orthographic projection of the receiver on the glass cover plate; and
the second light guide structure obliquely extends from a light receiving surface of the receiver toward the glass cover plate, and an oblique direction is away from an orthographic projection of the transmitter on the glass cover plate;
wherein the first light guide structure comprises a first light guide tube and a second light guide tube, a first end of the first light guide tube faces the transmitter, a second end of the first light guide tube is communicated with and fixedly connected to a first end of the second light guide tube, and a second end of the second light guide tube faces the glass cover plate; and
an inner wall of the first light guide tube is coated with a specular reflection material, an inner wall of the second light guide tube is coated with a light absorbing material;
the second light guide structure comprises a third light guide tube and a fourth light guide tube, a first end of the third light guide tube faces the receiver, a second end of the third light guide tube is communicated with and fixedly connected to a first end of the fourth light guide tube, and a second end of the fourth light guide tube faces the glass cover plate; and
an inner wall of the third light guide tube is coated with a specular reflection material, an inner wall of the fourth light guide tube is coated with a reflection material, and an included angle between an axis of the third light guide tube and a facing direction of the receiver is greater than 0° and less than 90°;
wherein an included angle between an axis of the first light guide tube and a facing direction of the transmitter is 45°.

16. The terminal according to claim 15, wherein the first light guide structure further comprises a first transition light guide tube, a first end of the first transition light guide tube faces the transmitter, a second end of the first transition light guide tube is communicated with and fixedly connected to the first end of the first light guide tube, an inner wall of the first transition light guide tube is coated with a specular reflection material, and an axis of the first transition light guide tube is parallel to the facing direction of the transmitter.

17. The terminal according to claim 15, wherein the first light guide structure further comprises a second transition light guide tube, a first end of the second transition light guide tube is communicated with and fixedly connected to the second end of the first light guide tube, a second end of the second transition light guide tube is communicated with and fixedly connected to the first end of the second light guide tube, an inner wall of the second transition light guide tube is coated with a specular reflection material, and an axis of the second transition light guide tube is parallel to the facing direction of the transmitter.

18. The terminal according to claim 15, wherein the second light guide structure further comprises a third transition light guide tube, a first end of the third transition light guide tube faces the receiver, a second end of the third transition light guide tube is communicated with and fixedly connected to the first end of the third light guide tube, an inner wall of the third transition light guide tube is coated with a specular reflection material, and an axis of the third transition light guide tube is parallel to the facing direction of the receiver.

19. The terminal according to claim 15, wherein the second light guide structure further comprises a fourth transition light guide tube, a first end of the fourth transition light guide tube is communicated with and fixedly connected to the second end of the third light guide tube, a second end of the fourth transition light guide tube is communicated with and fixedly connected to the first end of the fourth light guide tube, an inner wall of the fourth transition light guide tube is coated with a specular reflection material, and an axis of the fourth transition light guide tube is parallel to the facing direction of the receiver.

* * * * *